Patented Aug. 14, 1951

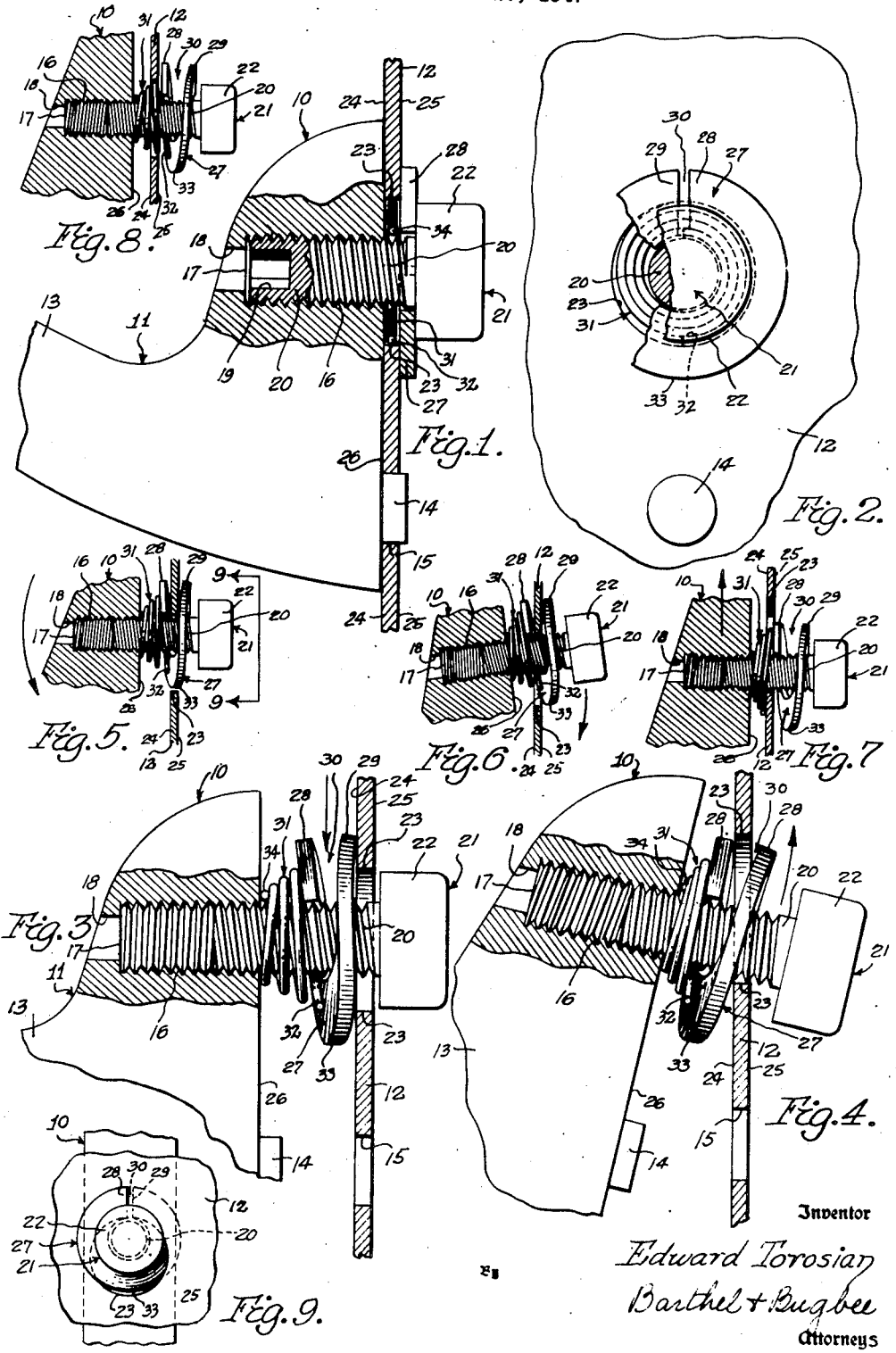

2,563,976

UNITED STATES PATENT OFFICE 2,563,976

BLIND ATTACHMENT DEVICE

Edward Torosian, Grosse Pointe, Mich., assignor to J. W. Speaker Corporation, Milwaukee, Wis., a corporation of Wisconsin Application November 20, 1947, Serial No. 787,167

7 Claims. (Cl. 85—1)

This invention relates generally to attachment devices and in particular to such devices for securing articles to supports having blind attachment holes such as are accessible from one side only of the support and inaccessible from the other side thereof.

One object of this invention is to provide an attachment device for mounting an article upon a support wherein the connection is made by a novel fastening construction which is capable of being inserted through a blind hole and tightened into a secure and rigid position without requiring access to the blind or opposite side of the hole from the article.

Another object is to provide an attachment device for mounting an article upon a support having a blind hole, wherein use is made of a fastening device employing a helical washer and a spiral spring together with a threaded fastener which is rotatable from the outside of the article, the helical washer being insertable through the hole in a quick and easy manner and simply and rapidly tightened in position.

Another object is to provide an attachment device for mounting an article upon a support, wherein a helical washer and conical spiral spring surrounding the shank of a fastener threaded into the article, the head of the fastener and the gap in the washer being insertable through the blind hole and tightened against the opposite side thereof by a male type wrench, screw driver, or the like inserted in a recess in the outer end of the threaded shank of the fastener, so that all adjustments are made from the outside without requiring access to the head of the fastener or to the helical washer, the conical spiral spring filling in the space between the shank and the margin of the hole when the fastener is rotated to draw the article tightly into engagement with the support.

Another object is to provide an attachment device for mounting an article upon a support, wherein the article may be detached from the support in a simple and rapid manner merely by reversing the foregoing attachment procedure.

In the drawings:

Figure 1 is a side elevation, partly in section, of an attachment device according to a preferred form of the invention, with the article completely attached to the support;

Figure 2 is a rear elevation, partly broken away, of an article secured to a support by the attachment device of Figure 1;

Figure 3 is a fragmentary side elevation, partly in section, of the attachment device of Figure 1 at the start of the attaching operation;

Figure 4 is a view similar to Figure 3 but showing the helical washer being partly inserted in the blind hole of the support;

Figure 5 is a view similar to Figures 3 and 4 but showing the helical washer inserted halfway through the blind hole;

Figure 6 is a view similar to Figures 3, 4 and 5 but showing the major portion of the helical washer inserted through the blind hole in the support;

Figure 7 is a view similar to Figures 3 to 6 inclusive, but showing the helical washer completely inserted through the blind hole in the support;

Figure 8 is a view similar to Figures 3 to 7 inclusive but showing the helical washer completely inserted, the threaded fastener centered in the blind hole and the conical spring snapped into the blind hole ready for tightening into the final position shown in Figure 1; and Figure 9 is a rear elevation of the fastening device partly inserted in the blind hole of the support, looking in the direction of the arrows 9—9 in Figure 5.

Hitherto the attachment of articles to supports having only one side accessible has presented a difficult problem. This problem has been especially acute in mounting articles such as rear view mirrors, spot lights and other automobile accessories upon automobile bodies since the articles must ordinarily be attached to the bodies after the final assembly of the automobile. On this account the body, which served as the support for the article, is accessible only from the outside and hence any attachment device must be capable of being inserted in the hole and tightened from the outside only. Prior devices have failed to hold the article rigidly against subsequent dislodgment by reason of road shocks and vibrations and their use has often caused the paint on the body to be scraped while the article was being attached. Prior attachment devices have also been lacking in firmness and rigidity and have also been deficient in mechanical strength as well as unattractive appearance.

The present invention enables the article, such as a rear view mirror or spot light, to be quickly and easily attached to the support such as an automobile body, merely by drilling a hole in the support, together with an optional locating hole to prevent undesired rotation of the article. The attachment device is then quickly and easily inserted through the blind hole and by a simple motion completely lodged in the space behind the support on the inaccessible side thereof, after which the fastener of the attachment device may be quickly tightened from the outside so as to draw the article tightly and rigidly into contact with the support, such as the automobile body.

Referring to the drawings in detail, Figures 1, 2 and 3 show the base 10 of an article 11 which it is desired to attach firmly and rigidly to a support 12. For convenience the article 11 is shown as the inner portion of a rear view mirror, the mirror (not shown) being mounted upon the arm 13 projecting outward from the base 10.

The base 10 is provided with a rearwardly-projecting lug or boss 14 which forms a locating pin adapted to be inserted in a locating hole 15 in the support 12. The locating pin 14 serves the purpose of preventing rotation of the base 10 of the article 11 when the latter has been mounted in its desired position. The base 10 is also provided with a threaded bore 16 spaced laterally away from the locating pin or lug 14, the threaded bore 16 terminating short of the forward wall 17 of the base 10 so as to render the bore 16 as inconspicuous as possible. A reduced diameter smooth bore 18 communicates with the threaded bore 16 and is coaxial therewith and serves for the insertion of a socket wrench or hexagonal or other suitable cross section into a corresponding hexagonal socket 19 in the free end of the shank 20 of a threaded fastener 21 having an enlarged head 22 on the opposite end of the shank from the socket 19.

The article 11 is attached to the support 12 by means of a blind hole 23 which is slightly larger in diameter than the fastener head 22 so as to permit the latter to be easily inserted. The fastener head 22 does not ordinarily require a slot or a wrench socket since it is ordinarily inaccessible on the blind side 25 of the support 12, the outer side 24 being ordinarily the only side which is accessible. The outside surface 24 and the base surface 26 of the article 11 are preferably shaped to mate with one another so that there will be no wobbling when the article 11 is mounted in position. Ordinarily, of course, the surfaces 24 and 26 are flat.

Mounted upon the threaded shank 20 of the fastener 21 is a helical spring washer 27 having ends 28 and 29 separated by a gap 30. While a non-resilient washer might be employed, a spring washer is preferred because of the greater ease of subsequently removing the article in the event that it is desired to do so for repair or replacement purposes. Between the washer 27 and the base surface 26 of the article 11 and also surrounding the threaded shank 20 of the fastener 21 is mounted a conical spiral spring 31, the major convolution 32 of which is of slightly less diameter than the blind hole 23 so as to fit snugly therein when the fastener 21 is tightened.

In the use of the attachment device of this invention, the spring washer 27 and conical spring 31 are mounted upon the fastener 21 and the latter threaded partway into the threaded bore 16 in the manner shown in Figure 3. As shown in the same figure, the head 22 of the fastener 21 is then pushed through the blind hole 23, slightly compressing the conical spring 31.

The base 10 of the article 11 is then tilted slightly (Figure 4) to enable one of the ends 28 or 29 of the spring washer 27 to be hooked through the blind hole 23 so that the gap 30 in the washer lies within the hole 23. The base 10 is then pushed upward in the direction of the arrow in Figure 4 so that the gap 30 in the washer 27 moves upward relatively to the upper edge of the blind hole 23 (Figure 5) causing the free ends 28 and 29 of the washer 27 to lie on the opposite sides 24 and 25 of the support 12. The base 10 is now sunk downward in the direction of the arrow in Figure 5 so that the approximate midportion 33 of the spring washer 27 lies adjacent the lower edge of the blind hole 23.

The base 10 is now tilted downward and inward and at the same time moved downward in the direction of the arrow in Figure 6 until the midportion 33 of the helical washer 27 moves behind the rear surface 25 of the support 12. The base 10 is then swung downward in the direction of the arrow in Figure 6 until the end 28 of the helical washer 27 likewise passes through the blind hole 23 into the position of Figure 27.

The base 10 is then moved upward in the direction of the arrow in Figure 7 until the shank 20 of the threaded fastener 21 is substantially in the center of the blind hole 23. When this occurs, the larger convolution 32 of the conical spring 31 snaps into the blind hole 23 (Figure 8) and the device is ready for tightening into its final position.

To tighten the article 10 and draw it into its final position shown in Figure 1, a male type plug wrench, such as the so-called Allen headless set screw wrench, is inserted through the small diameter hole 18 into the socket 19 in the free end of the fastener shank 20. The wrench (not shown) is then rotated, rotating the fastener 21 and threading it into the threaded bore 16 in the position shown in Figure 1. At the same time, the helical washer 27 is tightened flat against the inside or inaccessible surface 25 of the support 12 and the conical spring 31 is likewise compressed into a flat position within the blind hole 23. The conical spring 31 when thus compressed, serves as a centering washer with the outer edge of its major convolution 32 fitting the inner wall of the hole 23 and the inner edge of its minor convolution 34 fitting around the threaded shank 20. The base 10 is then pushed against the support 12 to insert the locating pin or lug 14 in the hole 15, and the wrench is then rotated until the fastener 21 is threaded into the threaded bore 16 as far as it will go, causing the parts to be snugly and firmly drawn together into the position shown in Figure 1.

To remove the article 11 from the support 12, the foregoing operations are reversed. A suitable socket wrench is inserted through the hole 18 into the socket 19 and rotated to turn the fastener 21 in the reverse direction, moving it rearward into the position shown in Figure 8. The base 10 is then successively manipulated by reversing the foregoing motions, passing successively through the positions shown in Figures 8, 7, 6, 5 and 4 into the position shown in Figure 3. The article 11 may then be removed from the support 12 for repair or replacement purposes.

Thus it will be seen that the present invention provides an attachment device which is simple in construction and which is quickly and easily attached to a support merely by boring a hole in the support and manipulating the article in the manner described above. The motions required in attaching the device will not injure the exposed surface 24 of the support 12 nor any finish applied thereto. The article is also easily removed merely by reversing the attachment operations. When in position, the article 11 is firmly and rigidly attached to the support 12 without danger of dislodgement and the only evidence of attachment is the hole 18 which being smooth-walled and of small diameter, is very inconspicuous.

What I claim is:

1. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, and a spring encircling said shank between said base and said washer, the maximum diameter of said spring being smaller than the diameter of said hole.

2. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, and a conical spiral spring encircling said shank between said base and said washer, the maximum diameter of said spring being smaller than the diameter of said hole.

3. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, and a conical spiral spring encircling said shank between said base and said washer, the major convolution of said spring having a diameter slightly less than the diameter of said hole.

4. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, and a conical spiral spring encircling said shank between said base and said washer, the major convolution of said spring having a diameter slightly less than the diameter of said hole, and the minor convolution thereof having a diameter slightly greater than the diameter of said shank.

5. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, said threaded bore having a counterbore adjacent the end of said shank with a diameter approximately equal to the diameter of said tool-engaging portion, and a spring encircling said shank between said base and said washer, the maximum diameter of said spring being smaller than the diameter of said hole.

6. A device for attaching an article to a support with a blind hole, comprising an article base having a threaded bore therethrough, a headed fastener having a shank threaded into said bore, said shank having a rotary tool-engaging portion on the end thereof, a split helical washer with its ends separated by a gap, said washer encircling said shank and having an outer diameter greater than the diameter of said hole, said tool-engaging portion comprising a non-circular recess engageable by a correspondingly-shaped non-circular projection on the end of said rotary tool, and a spring encircling said shank between said base and said washer, the maximum diameter of said spring being smaller than the diameter of said hole.

7. Mounting means for securing a supporting bracket to the front side of a supporting wall having a blind hole therein accessible only from the front, comprising: an enlarged base on the bracket having a rear surface shaped to fit the front side of said supporting wall, and having a bore extending therethrough from front to rear, said bore having a threaded portion therein and a reduced front end portion; a threaded fastener screwed into the threaded portion of the bore from the rear of the base with one end thereof projecting rearwardly from the base and its other end at all times within the threaded portion of the bore, said other end of the fastener having a non-circular tool receiving recess therein adapted to receive a driving tool inserted into the bore from the front of the base through the reduced front end portion of the bore; a split helical member on the rearwardly projecting end of the fastener, said helical member having its ends separated by a gap and having an outer diameter greater than the diameter of said hole but adapted to be worked therethrough to a position behind the supporting wall; means holding said helical member on the fastener and preventing its removal from the rearwardly projecting end thereof; and a projection on the base adapted to enter a recess in the supporting wall to prevent rotation of the bracket, whereby rotation of the fastener from the front of the bracket clamps the wall between the base and the helical member and secures the bracket in place.

EDWARD TOROSIAN.

REFERENCES CITED

The following references are of record in the file of this patent:

UNITED STATES PATENTS

| Number | Name | Date |
| --- | --- | --- |
| 1,262,300 | Blake | Apr. 9, 1918 |
| 1,797,766 | Frye | Mar. 24, 1931 |
| 2,212,033 | Morley | Aug. 20, 1940 |
| 2,329,815 | Attwood | Sept. 21, 1943 |